(12) United States Patent
Atkins et al.

(10) Patent No.: US 11,368,315 B2
(45) Date of Patent: Jun. 21, 2022

(54) SYSTEMS AND METHODS OF DEVICE OWNERSHIP SELF-VERIFICATION

(71) Applicant: VERIDIFY SECURITY INC., Shelton, CT (US)

(72) Inventors: Derek A. Atkins, Shelton, CT (US);
Brian A. Marks, Shelton, CT (US);
Louis M. Parks, Shelton, CT (US);
Richard D. Smith, Shelton, CT (US)

(73) Assignee: VERIDIFY SECURITY INC., Shelton, CT (US)

( * ) Notice: Subject to any disclaimer, the term of this patent is extended or adjusted under 35 U.S.C. 154(b) by 14 days.

(21) Appl. No.: 16/931,028

(22) Filed: Jul. 16, 2020

(65) Prior Publication Data

US 2021/0021432 A1    Jan. 21, 2021

Related U.S. Application Data

(60) Provisional application No. 62/874,821, filed on Jul. 16, 2019.

(51) Int. Cl.
*H04L 9/32* (2006.01)
*H04L 9/06* (2006.01)

(52) U.S. Cl.
CPC .......... *H04L 9/3252* (2013.01); *H04L 9/0637* (2013.01); *H04L 9/3213* (2013.01); *H04L 9/3242* (2013.01); *H04L 9/3265* (2013.01)

(58) Field of Classification Search
CPC ... H04L 9/3252; H04L 9/0637; H04L 9/3265; H04L 9/3242; H04L 9/3213

USPC ........................................................ 713/180
See application file for complete search history.

(56) References Cited

U.S. PATENT DOCUMENTS

| | | | |
|---|---|---|---|
| 2010/0329464 A1* | 12/2010 | Kerschbaum | G06Q 10/087 380/279 |
| 2013/0290358 A1* | 10/2013 | Dogaru | G06Q 30/018 707/756 |
| 2016/0358184 A1* | 12/2016 | Radocchia | G06Q 30/0185 |
| 2017/0232300 A1* | 8/2017 | Tran | H04L 67/10 434/247 |
| 2017/0250814 A1* | 8/2017 | Brickell | H04W 12/37 |
| 2019/0089532 A1* | 3/2019 | Lambert | H04L 63/08 |
| 2019/0130398 A1* | 5/2019 | Brown | H04L 9/3239 |

* cited by examiner

*Primary Examiner* — Bryan F Wright
(74) *Attorney, Agent, or Firm* — DLA Piper LLP US

(57) ABSTRACT

A processor of a device may provision a component of the device with a digital signature algorithm and an authentication key algorithm and/or server-provisioned private and/or public keys. The processor may generate one or more private keys and public keys and/or store them in a secure memory of the device. The processor may transmit the generated public keys to an owner server and receive a pedigree document in response, which may be signed with the private key. The owner server may determine a change in an ownership of the device and append the pedigree document in an immutable fashion in response to the determining to reflect the change in the ownership and/or sign the appended pedigree document with a private key. A chain of ownership of the device is verifiable using only information contained within the appended pedigree document and rooted in the processor itself.

36 Claims, 9 Drawing Sheets

SYSTEMS AND METHODS OF DEVICE OWNERSHIP SELF-VERIFICATION

CROSS-REFERENCE TO RELATED APPLICATION

This application claims the benefit of priority from U.S. Provisional Application No. 62/874,821, filed Jul. 16, 2019, the entirety of which is incorporated by reference herein.

BACKGROUND OF THE INVENTION

With smart devices, which may be resource constrained, being manufactured and deployed by organizations and individuals, there is an increasing need for methods and systems that manage such device's security and ownership through the supply-chain and product life-cycle. Of particular importance is not only the ability to manage the security of the physical asset, but the ability to mutually authenticate a device, which proves ownership, in the absence of a connection, communication link, to a public network such as an internet-based cloud service and without direct intervention on the device during the deployment process. That is, the owner of said device may provide its ownership document in an electronic form that proves its ownership, and ownership transfer through the supply-chain, without a communication link back to said device's initial security provisioning and without direct provisioning the device at the time of deployment.

BRIEF DESCRIPTION OF THE FIGURES

The features of this disclosure will become more fully apparent from the following descriptions and appended claims, taken in conjunction with the accompanying drawings. It is stipulated that these drawings depict only several embodiments in accordance with the disclosure and are, therefore, not to be considered limiting of its scope, the disclosure will be described with additional specificity and detail through use of the accompanying drawings, in which:

Figure 1:
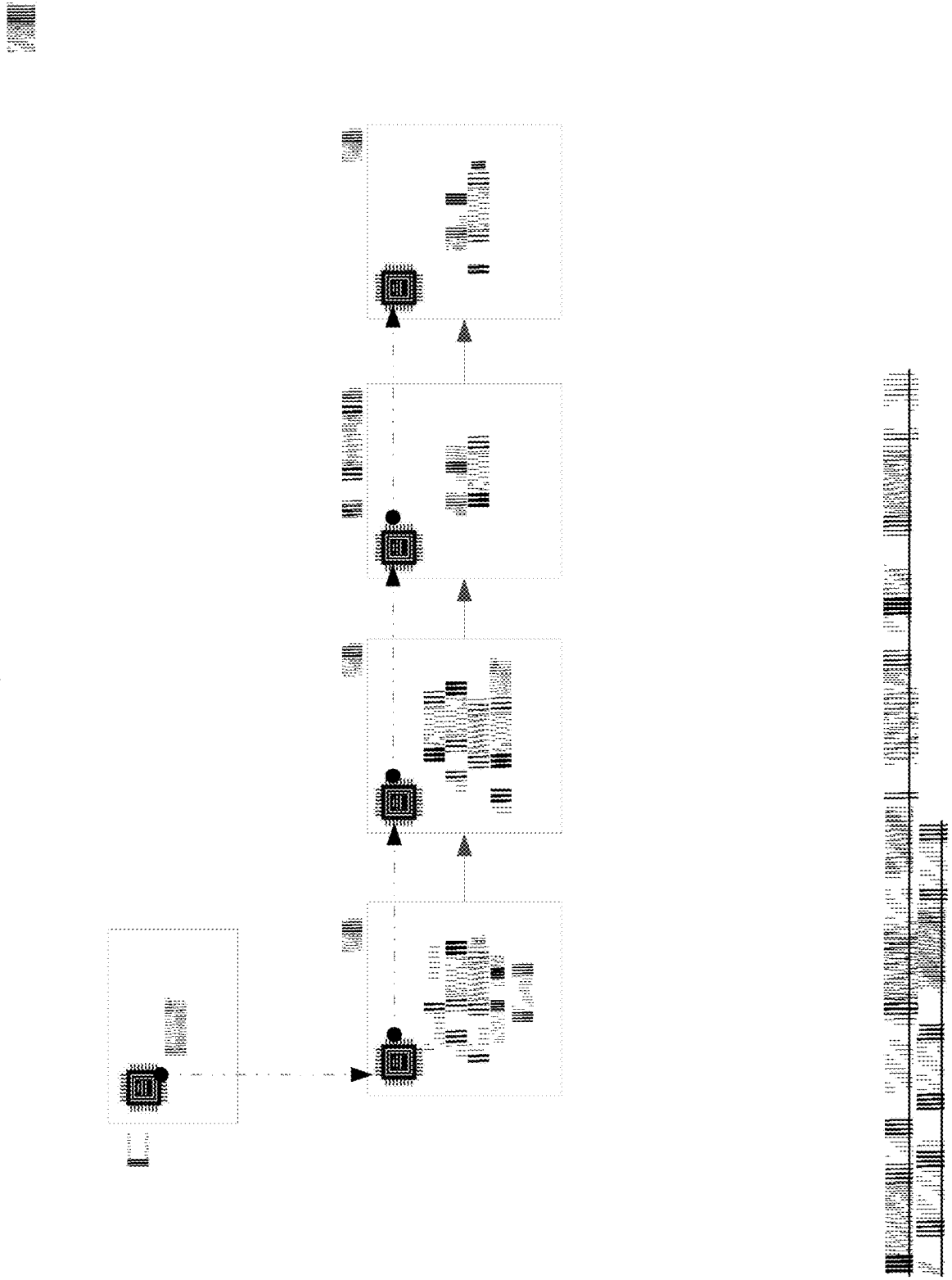
FIG. 1 illustrates an example system that may be utilized to implement device security through on-boarding applicable security components, managing the ownership transfer process and creating a pedigree of ownership transfer, proving ownership, and mutual authentication.

all arranged according to at least some embodiments described herein.

DETAILED DESCRIPTION OF THE PREFERRED EMBODIMENT(S)

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Some embodiments described herein may include systems and processes for identifying, securing, transferring ownership, and mutually authenticating a device, which may be resource constrained, through the device life cycle. In some embodiments a device, such as a processor, may be secured by on-boarding applicable data in secure memory whereupon an ownership pedigree is created. Said ownership pedigree may be in the form of a single electronic document or may be in the form of a blockchain-type construct, as such device is transferred through the supply-chain which may allow each owner of such device to update and append such device's latest ownership information to said electronic pedigree, and may mutually authenticate, which may prove its ownership and such device's identity, in the absence of a unified global connection such as an internet-based cloud service.

FIG. 1 illustrates an example system 100 that may implement device security through on-boarding applicable security components, creating a pedigree of ownership, managing the ownership transfer process, proving ownership, and mutual authentication. The system may include a device 101 that may be a processor, dedicated digital logic circuit, or system on chip (SoC), which may be embedded in a product such as a thermostat, water meter, smart meter, printer, electronic control unit (ECU), medical device imaging machine, etc. Device security may be configured, provisioned, on-boarded, via a computing device such as a desktop computer, a laptop computer, hardware security module (HSM) or such other device through a communication link that may be a direct connection to device 101 or a network, which may be a wireless network, a wired network, the internet, a cellular network, a near field communication (NFC) network, a radio frequency identification (RFID) network, a cloud computing environment for purposes of creating the device root of trust for purposes of validating ownership and authentication.

As will be described in more detail below, device 101 may be physically transferred to another owner such as a manufacturer, systems integrator, or such other party in the supply-chain. Prior to an initial physical transfer, an electronic pedigree document may be created with information that may include a device identifier, device product description, owner identifier, and applicable cryptographic information, which may include public keys, digital signatures, and a timestamp, which may allow for proof of ownership of the device 101 and, thereafter, mutual authentication of the device for purposes of creating a root of trust residing on such device. Thereafter, in association with each physical transfer, prior to, concurrent with, or subsequent to, such physical transfer, the electronic pedigree document may be updated with appended ownership information and associated cryptographic information, which may allow for proof of ownership of device 101 and, thereafter, mutual authentication of such device for purposes of creating a root of trust residing on such device.

Figure 2:
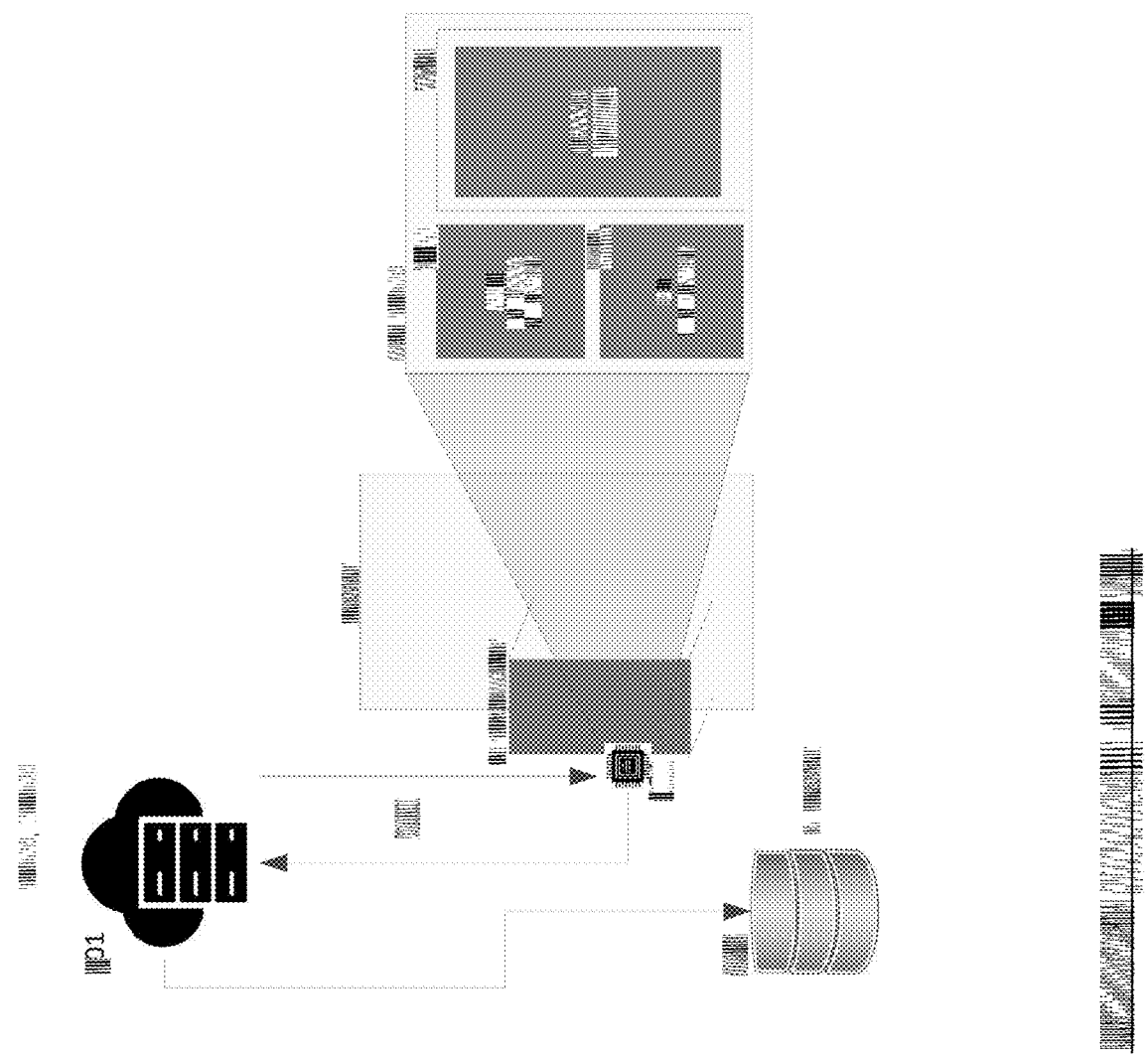
FIG. 2 illustrates an example system that may be utilized to on-board security components into secure memory.

FIG. 2 illustrates an example system 200 that may perform processing described herein and thereby on-board security components into secure memory 206, which may be random-access memory, electronically erasable programmable memory, one-time programmable memory, protected memory, read-only memory, or combination thereof for purposes of the creation of a root of trust. As described in more detail below, the root of trust may be created by the provisioning, on-boarding, the device via a computing device 201, such as a desktop computer, a laptop computer, hardware security module (HSM) or such other device through a communication link 202 that may be a direct connection or a network, which may be a wireless network, a wired network, the internet, a cellular network, a near field communication (NFC) network, a radio frequency identification (RFID) network, a cloud computing environment, or combination thereof, to the device. Once the device is provisioned, the device may place in secure memory 206, some or all of its cryptographic information, the public portion of which may be transferred through a communication link 202 for creation of an electronic pedigree document and stored in database 203 of the computing device 201.

Figure 3:
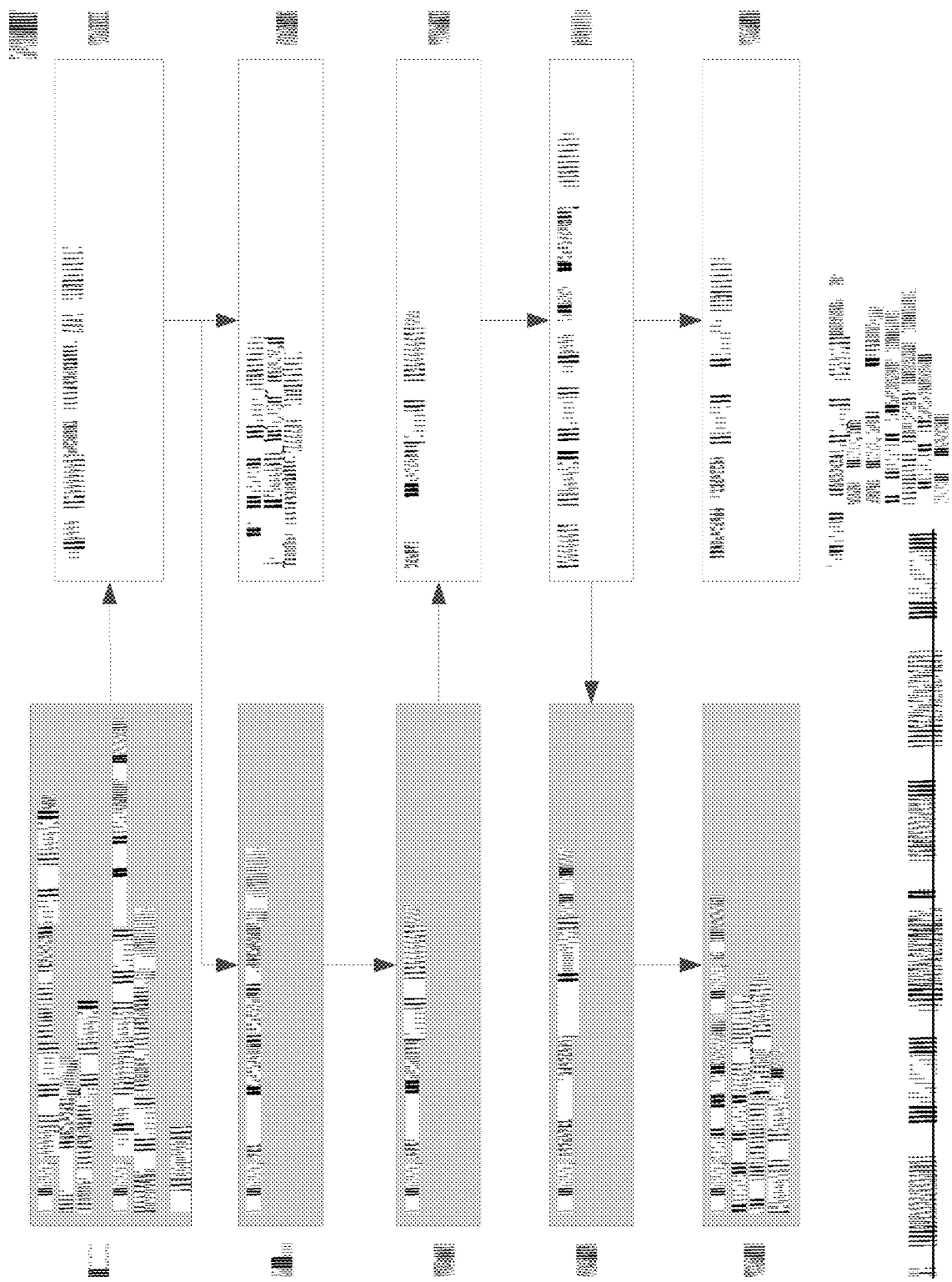
FIG. 3 illustrates a process that may be utilized to on-board security components into secure memory and create a pedigree of device ownership.

FIG. 3 illustrates a process 300 that may be utilized to on-board security components for purposes of creating a root of trust in the secure memory 206 of the device 101 and creating an electronic pedigree of device ownership stored in the database 203 on the server 201. Process 300 may include an operation 301 wherein owner server 201 may use a True Random Number Generator (TRNG) or a Pseudo Random Number Generator (PRNG), or some combination of the foregoing, to generate unique key material. The owner server then (i) may provision device 101 firmware with a digital signature algorithm engine as described in U.S. patent application Ser. No. 15/270,930, Signature Generation and Verification System (referred to herein as "WalnutDSA"), or Elliptic Curve Digital Signature Algorithm (ECDSA) or a combination of digital signature algorithms, and authentication key agreement protocol algorithm engine as described in U.S. patent application Ser. No. 15/585,654, Shared Secret Data Production System (referred to herein as "Ironwood KAP"), as described in U.S. patent application Ser. No. 16/841,756 (referred to herein as "Kingwood KAP"), Shared Secret Data Production with Use of Concealed Cloaking Elements, or Elliptic Curve Key Agreement Protocol (ECDH) or a combination of key agreement protocols (ii) may generate a private key and public key, which may use a TRNG or PRNG, or a combination of the foregoing, for the authentication protocol for the provisioned authentication algorithm such as Ironwood KAP, Kingwood KAP, or ECDH or some combination of key agreement protocols, (iii) may use a digital signature scheme like WalnutDSA or ECDSA or a combination of digital signature algorithms to sign the authentication public key, which may be in the form of Ironwood KAP, Kingwood KAP, or ECDH or some combination of key agreement protocols public key, and generate a certificate in a format such as X.509 or OpenPGP, and provisions such device 101, through a communication link 202, that may be a direct connection, link, or a network, which may be a wireless network, a wired network, the internet, a cellular network, a near field communication (NFC) network, a radio frequency identification (RFID) network, a cloud computing environment, or combination thereof, to the device with such private key as well as signed public key, which may be in the form of a certificate. In an operation 302, which may use a TRNG or PRNG, or a combination of the foregoing, device 101 may generate the output of its digital signature algorithm, such as WalnutDSA, ECDSA or combination of digital signature algorithms, which may include a public key and private key pair. In an operation 303, device 101 may store in secure memory 206 its digital signature public key and private key, which may be in the form of a WalnutDSA, ECDSA or combination of digital signature algorithms key pair, and its key agreement protocol public key and private key, which may be in the form of an Ironwood KAP, Kingwood KAP, or ECDH or some combination of key agreement protocols key pair.

In an operation 304, device 101 may transmit via a communication link to server 201, and such server 201 may receive a digital signature public key, such as the WalnutDSA, ECDSA or combination of digital signature algorithms public key from device 101. In an operation 305, server 201 may produce an electronic pedigree document, which may use a format such as XML, JSON, or CBOR, which may include a device digital signature public key such as a WalnutDSA, ECDSA or combination of digital signature algorithms public key, device key agreement protocol public key such as Ironwood KAP, Kingwood KAP, or ECDH or some combination of key agreement protocols public key, device product data, as well as owner identifier data and said owner's digital signature, which may be a WalnutDSA, ECDSA or combination of digital signature algorithms public key. In an operation 306, device 101 may receive the electronic pedigree document whereupon in operation 307, the device 101 may sign the electronic pedigree document with its digital signature private key, such as WalnutDSA, ECDSA or combination of digital signature algorithms private key. This data contained in the electronic pedigree document, may be combined and secured with a method, which may be a digital signature method, such as WalnutDSA, ECDSA or combination of digital signature algorithms, and said method may detect any modifications to the generated document, may bind the device 101 to ownership information in an immutable way in order to enable future verification and use of applicable information and establish device 101 as the root of trust for future verification of such electronic pedigree document or extensions thereto, thereby embedding the pedigree in the trusted device itself. In this way, the pedigree is rooted in the processor of the device itself, being immutably bound to the specific processor. Server 201, upon receiving the signed electronic pedigree document in operation 308, with the device 101, may release in operation 309 that which it may not require in secure memory 206. In an operation 310, server 201 may transmit to database 203 the electronic pedigree document as well as the device digital signature public key, such as a WalnutDSA, ECDSA or combination of digital signature algorithms public key, and device key agreement protocol public key, such as Ironwood KAP, Kingwood KAP, or ECDH or some combination of key agreement protocols public key.

Figure 4:
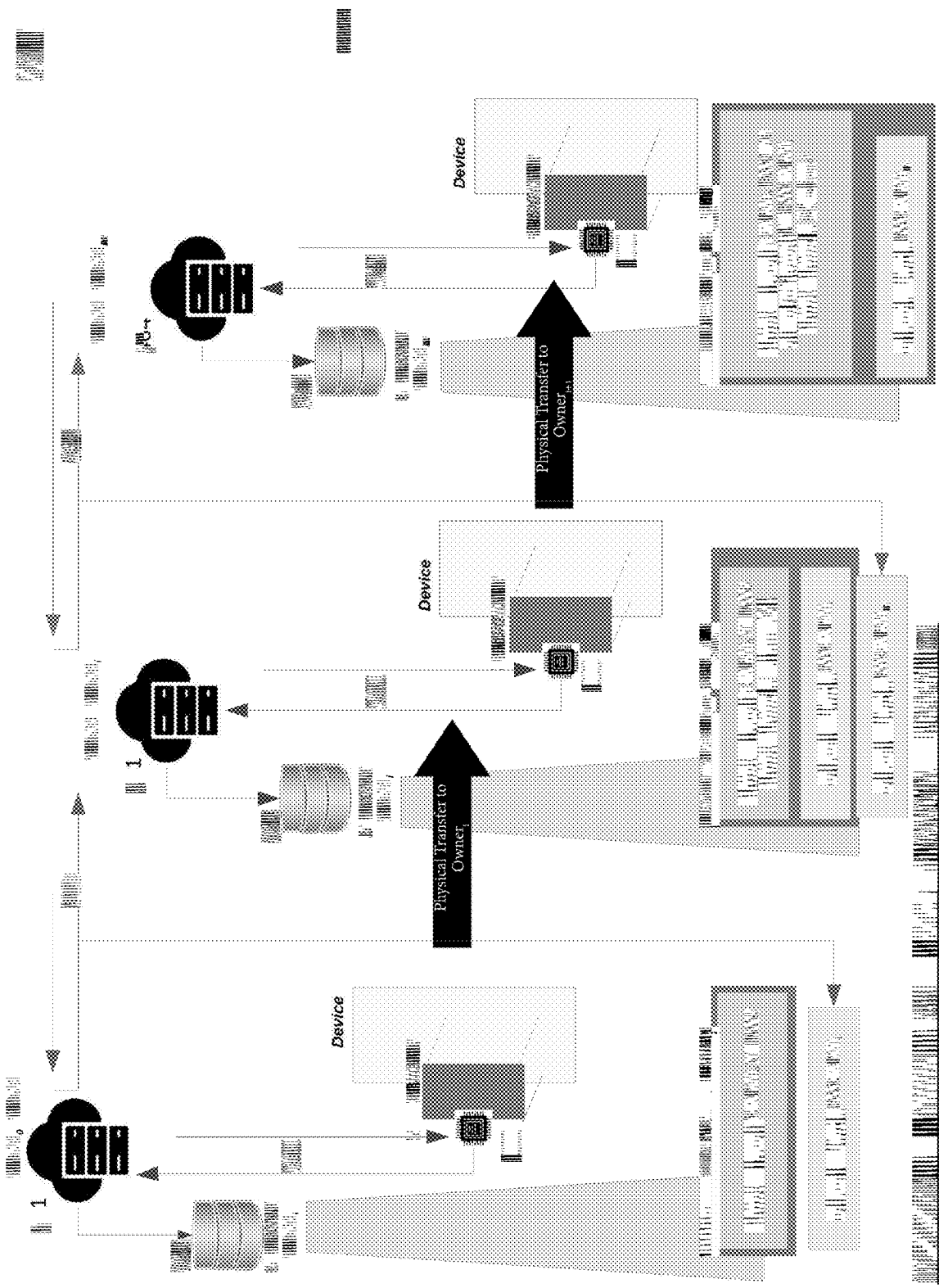
FIG. 4 illustrates an example system that may be utilized to transfer ownership of a device through the supply-chain along with the appending of ownership information to the pedigree of said device.

FIG. 4 illustrates an example system 400 that may be utilized to transfer ownership of a device 101 through the supply-chain along with appending ownership information to the pedigree of said device. As will be described in more detail below, device 101 may be physically transferred to a new owner, which may result from a commercial transaction, and concurrent with such physical transfer to said owner, server 401 of the new owner may transmit via a communication link 407, which may be direct or indirect through a third-party, some part of its information, which may include its owner identifier, digital signature public key, such as WalnutDSA, ECDSA or combination of digital signature algorithms public key, authentication public key, such as Ironwood KAP, Kingwood KAP, or ECDH or some combination of key agreement protocols public key, and such other applicable information to the transferor owner's server 201 for purposes of appending such information to the electronic pedigree document, which may be in a single electronic document or may be in a blockchain-type form. In some instances of said example system, the electronic pedigree document may be extended by taking the existing digitally signed electronic pedigree document and creating a new electronic pedigree document that may contain the pre-existing, immediately preceding, signed electronic pedigree document appended with the additional information from the new owner whereupon the transferor owner may use a method like WalnutDSA, ECDSA or combination of digital signature algorithms to generate a new digital signature enveloping the updated electronic pedigree document. In some cases, the updated information of the new owner which may be in a stand-alone, self-contained, block which references the previous block of the immediately preceding owner by taking a cryptographic hash of said previous block using a method like SHA2, SHA3, etc, and may include the hash value of said previous block with the new owner data thereby creating a chain of blocks whereupon the transferor owner creates a digital signature using a method like WalnutDSA, ECDSA or combination of digital signature algorithms, for purposes of signing the new block in the chain. The electronic pedigree document, which may be in the form of a single electronic pedigree document or a blockchain-type form may be returned via a communication link 407, which may be direct or indirect through a third-party, to server 404 and may be stored in said server's database 403. The foregoing system may repeat the foregoing processing for each physical transfer to a subsequent new owner, for example, whereupon concurrent with each physical transfer to such new owner, server 404 of the new subsequent owner may transmit via a communication link 408, which may be direct or indirect through a third-party, some or all of its information to the transferor owner's server 401 for purposes of appending such information to the pedigree document, which may be in the form of a single electronic pedigree document or a blockchain-type form, for return via a communication link to server 404 for storage in such server's database 405.

Figure 5:
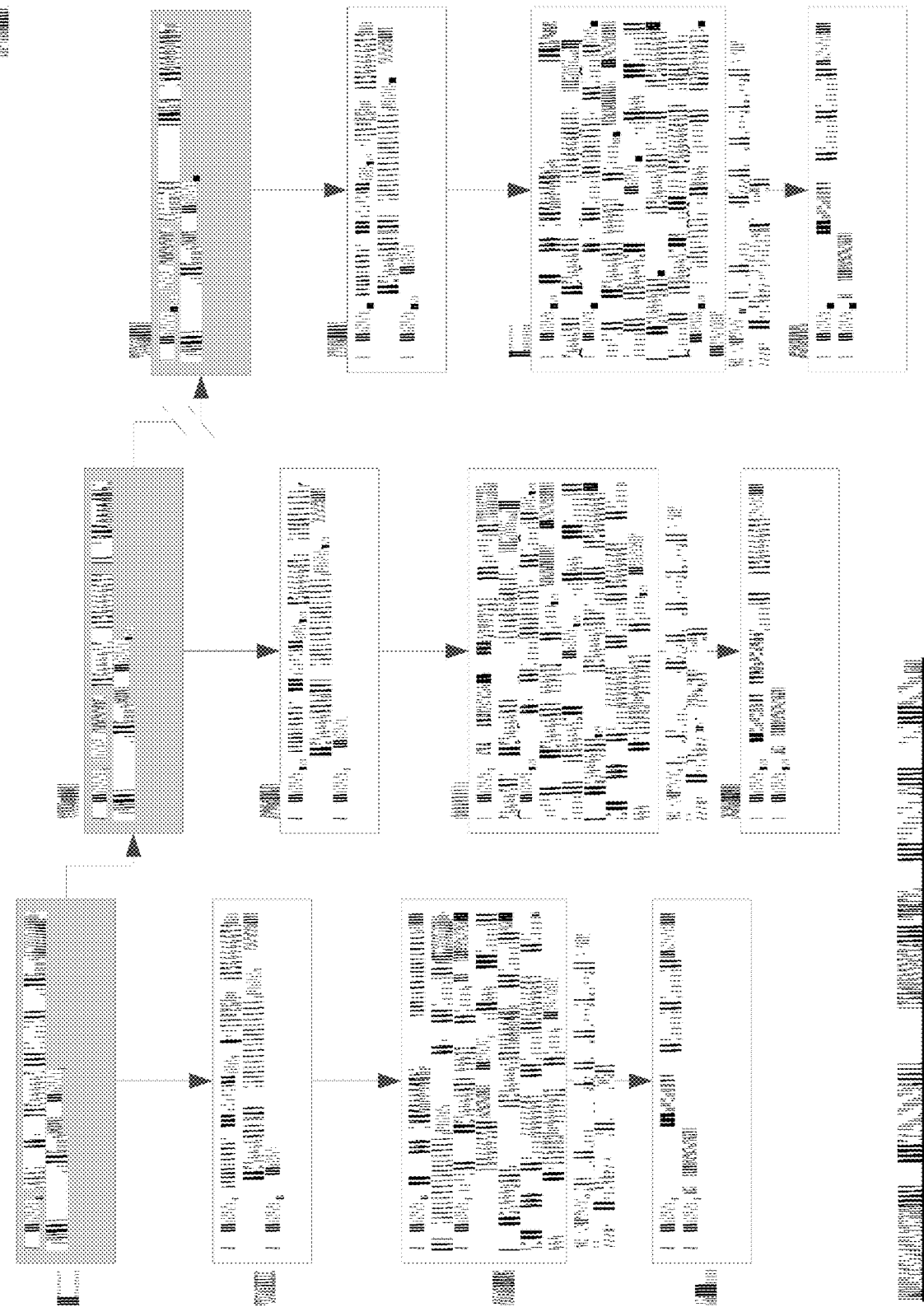
FIG. 5 illustrates a process that may be utilized to transfer ownership of a device through the supply-chain along with the appending of the ownership information to the pedigree of such device.

FIG. 5 illustrates a process 500 that may be utilized to transfer ownership of a device 101 through the supply-chain along with appending of the ownership data to the pedigree of such device. Process 500 may include an operation 501 wherein the owner physically transfers the device 101 to a new owner. The new owner may perform operation 502 which may transmit via a communication link 407, which may be direct or indirect through a third-party, its digital signature algorithm public key such as a WalnutDSA, ECDSA or combination of digital signature algorithms public key and its key agreement protocol public key such as an Ironwood KAP, Kingwood KAP, or ECDH or some combination of key agreement protocols public key, together with information such as its ownership identifier to the transferor's server 201 for purposes of appending such information to the pedigree document to indicate the new owner and enable the new owner to authenticate itself or transfer ownership to another entity, which may be in a single document or in a blockchain-type form. By performing operation 503, server 201 may generate an updated electronic pedigree document, which may be a single electronic pedigree document that contains the pre-existing ownership information as well as appended ownership information, which may include the new owner's identification, digital signature public key, authentication public key, timestamp, etc. or may be a blockchain-type form, which may consist of a hash of the previous block, and the transferee, new, owner identifier, digital signature public key, authentication public key, timestamp, etc., either of which may be generated in a format such as XML, JSON, CBOR, and all or some of which may be signed, directly or indirectly, by reference, by the transferor owner's digital signature private key such as a WalnutDSA, ECDSA or combination of digital signature algorithms private key, and may return via a communication link 407, which may be direct or indirect through a third-party, to server 401, for storage in such server's database 403, the electronic pedigree document with appended new owner information. By performing operation 504, server 401 may store the electronic pedigree document in its database 403.

The foregoing process may repeat itself for each physical transfer to a subsequent and ultimately final new owner. In operation 505, an owner may physically transfer device 101 to a subsequent new owner, transferee, whereupon by performing operation 506, server 404 of said new owner may transmit via a communication link 408, which may be direct or indirect through a third-party, some or all of its information to the transferor owner's server 401. Transferor owner's server 401 may append such information to the electronic pedigree document, which may be in a single document or in a blockchain-type form, and return the electronic pedigree document via a communication link to server 404.

By performing operation 507, server 401 may return via a communication link 408, to server 404 for storage in said server's database 405, the pedigree document, which may be in a single document or in a blockchain-form, with appended new owner information in an operation similar to operation 503. By performing operation 508, server 404 may store the pedigree document in its database 405.

Figure 6:
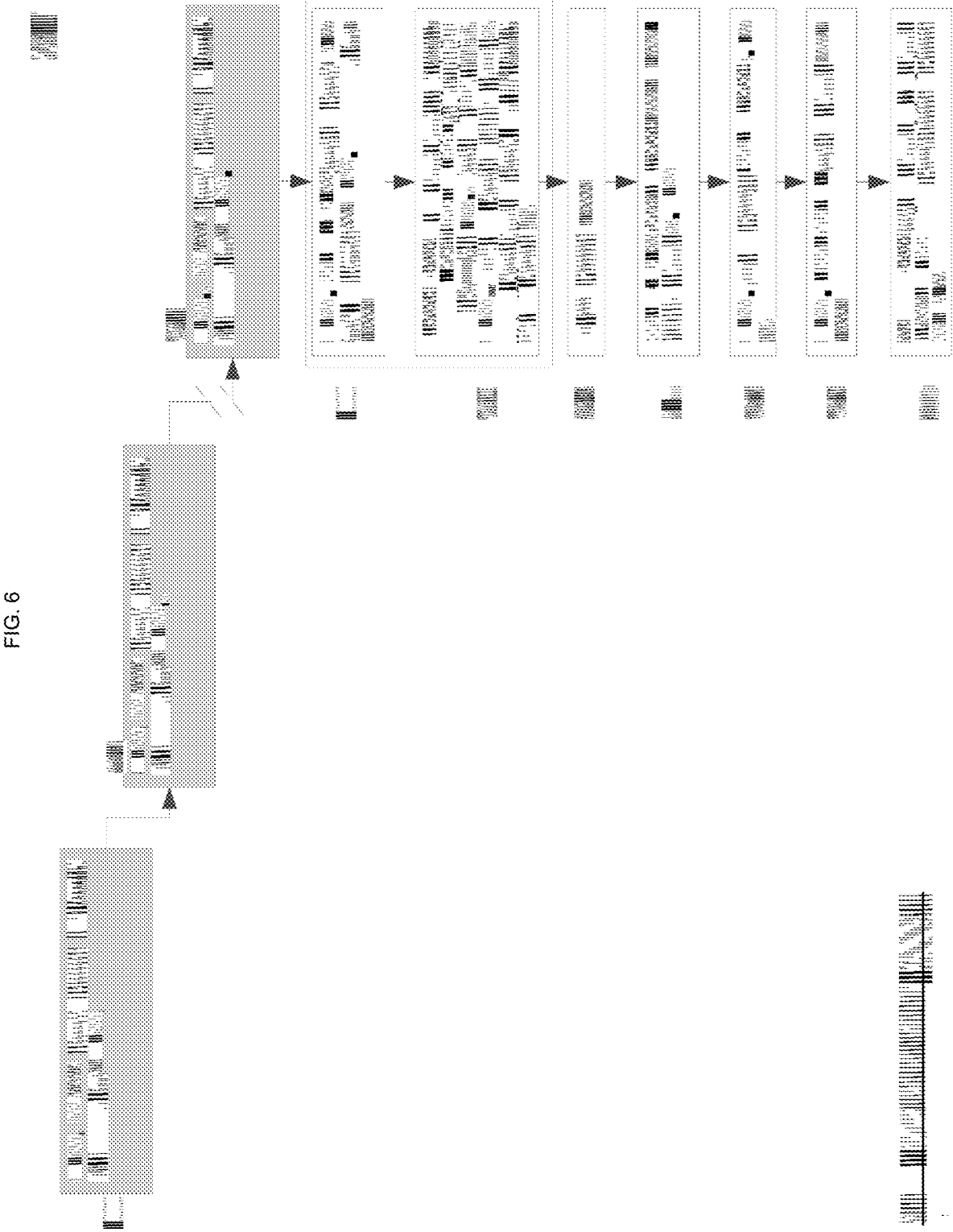
FIG. 6 illustrates an example process that may be utilized to prove ownership of a device.

FIG. 6 illustrates a process 600 that may be utilized to prove ownership of a device 101, which may be performed at or after the last transfer of ownership of the device or at each transfer of ownership of the device. Upon completion of process 500, the new owner server 404 may perform operation 601 and thereby transmit the electronic pedigree document with all appended information to device whereupon by operation 602, device 101 may verify the electronic pedigree document digital signatures, which may be in the form of a WalnutDSA, ECDSA or combination of digital signature algorithms signature, of each owner that was appended to the device's digital pedigree document, using the previous owner's digital signature public key, which may be in the form of a WalnutDSA, ECDSA or combination of digital signature algorithms public key with the final digital signature verification using the digital signature public key of the device itself. This proof of ownership may be an iterative process whereby device 101 may validate the digital signatures of the electronic pedigree document using the digital signature public keys, which may be in the form of a WalnutDSA, ECDSA or combination of digital signature algorithms public key, embedded in the electronic pedigree document. That is, device 101 may verify the digital signature of each owner, from latest to earliest, ultimately to its digital signature public key 302, which may be in the form of a WalnutDSA, ECDSA or combination of digital signature algorithms public key. A failure of digital signature verification during the process may cause the process to halt. Operation 601 and operation 602 may be repeated until successful verification occurs.

A device may perform operation 603 and thereby generate, using TRNG or PRNG, or any combination of the foregoing, a nonce, which may be used to prove in real-time the current authentication process and which may prevent replay-type attacks whereupon the device may perform operation 604 and thereby transmit the nonce to server 404. Server 404 may perform operation 605 and thereby sign the nonce with its digital signature private key, which may be in the form of a WalnutDSA, ECDSA or combination of digital signature algorithms private key, which may enable server 404 to prove to device 101 that it has possession and knowledge of said private key, which may match the digital signature public key in the electronic pedigree document. By performing operation 606, server 404 may transmit the signed nonce to the device 101, whereupon the device 101 may perform operation 607 and thereby verify the signed nonce. Upon verifying the validity of the digital signature, device 101 may store the digital signature and all or part of the electronic pedigree document in secure memory 206. By validating the signature, the device 101 proves that server 404 has possession of the digital signature private key that matches the digital signature public key in the electronic pedigree document, thereby proving that server 404 is the owner of the device 101.

Figure 7:
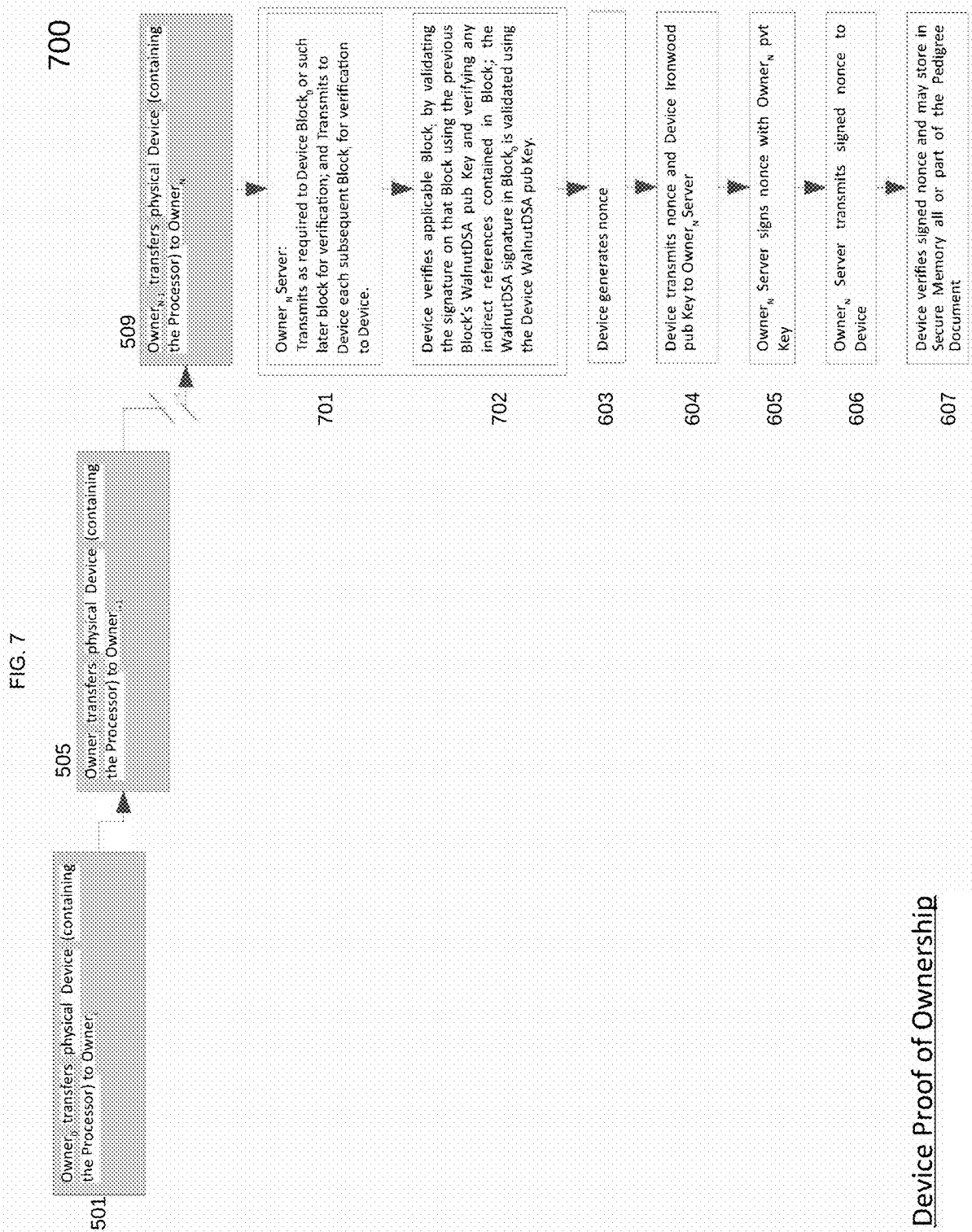
FIG. 7 illustrates a second example process based upon a blockchain-type method that may be utilized to prove ownership of a device.

FIG. 7 illustrates a second process 700 that may be based upon a blockchain-type method that may be utilized to prove ownership of a device 101, which may be performed at or after the last transfer of ownership of the device or at each transfer of ownership of the device through the supply-chain. The blockchain-type method may be processed one block at a time so that server 404 may transmit each applicable electronic pedigree document block, starting from the initial block or such later block as required, to device 101, whereby the device may process each block individually without having the entire chain in secure memory 206, thus saving secure memory resource requirements. Upon completion of process 500 by operation 701, the new owner server 404 may transmit the applicable device digital signature block as required for verification and may transmit each subsequent owner's digital signature block for verification to the device 101. By operation 702, the device 101 may verify each digital signature, which may be in a WalnutDSA, ECDSA or combination of digital signature algorithms form, on each block by validating the signature on the block using the previous block's digital signature public key, which may be in the form of WalnutDSA, ECDSA or combination of digital signature algorithms public key, and may verify any indirect reference contained in that block by computing the hash, which may use SHA2, SHA3, etc., of the previous block, including the initial digital signature of the device, 101, which may be in a WalnutDSA, ECDSA or combination of digital signature algorithms form, by validating using the device's digital signature public key, which may be in the form of a WalnutDSA, ECDSA or combination of digital signature algorithms public key. Operation 701 and operation 702 may continue until the entire blockchain has been validated by device 101. A failure of the digital signature verification during operation 70, may cause the process to halt. Operation 701 and operation 702 may be repeated until successful verification occurs.

By operation 603, a device may generate, using TRNG or PRNG, or any combination of the foregoing, a nonce, which may be used to prove in real-time the current authentication process and which may prevent replay-type attacks whereupon the device may perform operation 604 and thereby transmit the nonce to server 404. Server 404 may perform operation 605 and thereby sign the nonce with its digital signature private key, which may be in the form of a WalnutDSA, ECDSA or combination of digital signature algorithms private key, which may enable server 404 to prove to device 101 that it has possession and knowledge of said private key, which may match the digital signature public key in the electronic pedigree document. Server 404 may perform operation 606 and thereby transmit the signed nonce to the device 101, whereupon device 101 may perform operation 607 and thereby verify the signed nonce. Upon verifying the validity of the digital signature, device 101 may store it and all or part of the electronic pedigree document in secure memory 206. By validating the signature, the device 101 proves that server 404 has possession of the digital signature private key that matches the digital signature public key in the electronic pedigree document, thereby proving that server 404 is the owner of the device 101.

Figure 8:
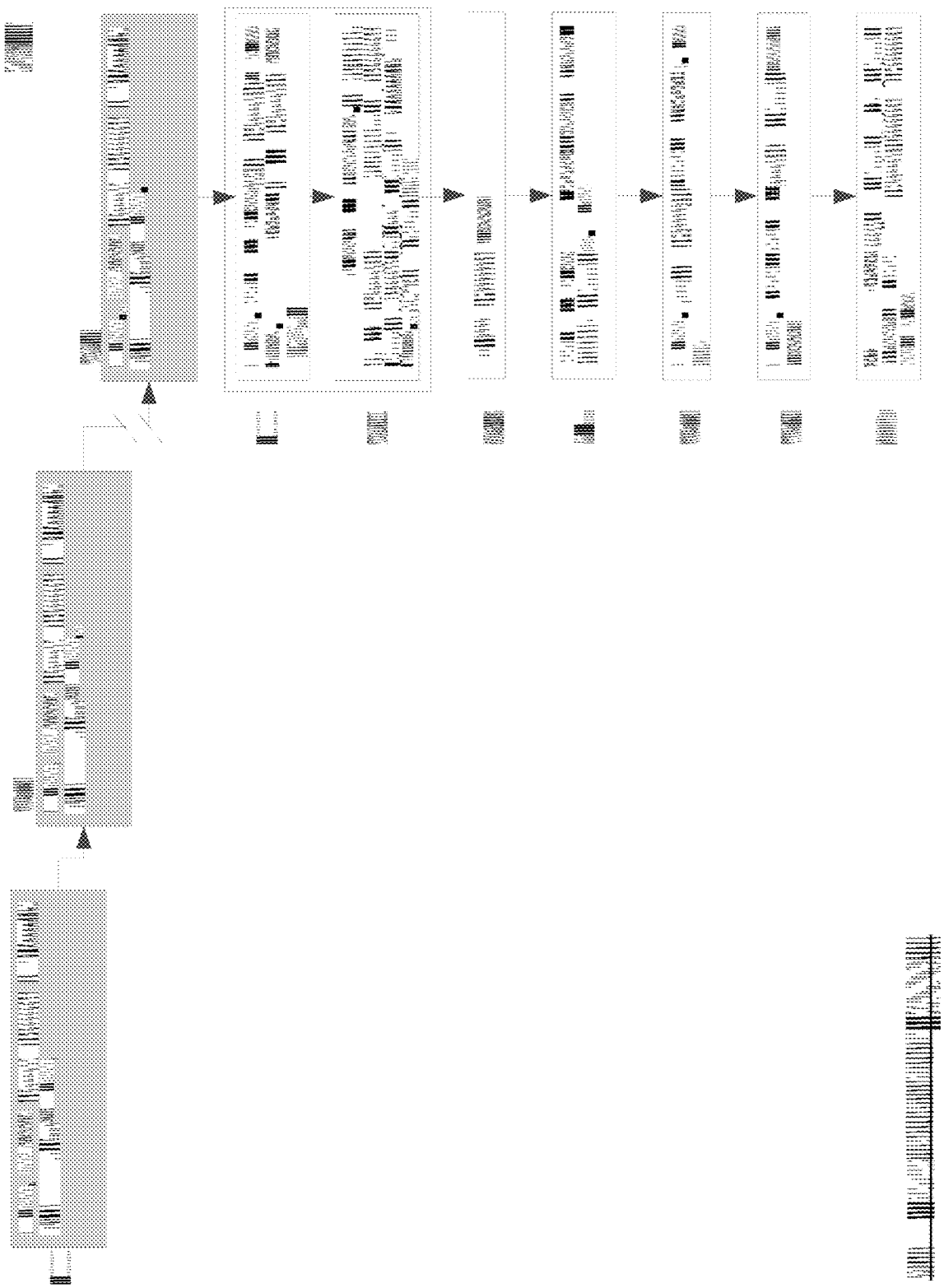
FIG. 8 illustrates a third example process based upon a blockchain-type method that may be utilized to prove ownership of a device.

FIG. 8 illustrates a third example process 800 that may be based upon a blockchain-type method that may be utilized to prove ownership of a device 101 which may be performed at or after the last transfer of ownership of the device or at each transfer of ownership of the device through the supply-chain. This blockchain-type method may be processed one block at a time so that server 404 may transmit each applicable electronic pedigree document block, starting from the latest block, to device 101, whereby the device may process each block individually without having the entire chain in secure memory 206, thus saving secure memory resource requirements as well as communication link bandwidth and processing time. Upon completion of process 500, by operation 801 the server 404 may transmit its digitally signed block, which may be in a WalnutDSA, ECDSA or combination of digital signature algorithms form, to the device 101. By operation 802, the device 101 may verify the digital signature, which may be in a WalnutDSA, ECDSA or combination of digital signature algorithms form, block by validating the signature on the block using the previous block's digital signature public key, which may be in the form of WalnutDSA, ECDSA or combination of digital signature algorithms public key, and may verify any indirect reference contained in that block, including the initial digital signature of the device 101, which may be in a WalnutDSA, ECDSA or combination of digital signature algorithms form, by using the device's digital signature public key, which may be in the form of a WalnutDSA, ECDSA or combination of digital signature algorithms public key. This may require server 404 to send both a block and previous block to device 101. The server 404 and device 101 may continue operation 801 and operation 802, stepping backwards in the chain, until the device 101 validates the chain back to a known state, or until a signature fails to validate, in which case the operation ceases. Operation 801 and operation 802 may be repeated until successful verification occurs.

Operation 603 may enable a device to generate using TRNG or PRNG, or any combination of the foregoing, a nonce, which may be used to prove in real-time the current authentication process and which may prevent replay-type attacks whereupon by operation 604, a device may transmit the nonce to server 404. Server 404 may perform operation 605 and thereby sign the nonce with its digital signature private key, which may be in the form of a WalnutDSA, ECDSA or combination of digital signature algorithms private key, which may enable server 404 to prove to device 101 that it has possession and knowledge of said private key, which may match the digital signature public key in the electronic pedigree document. By performing operation 606, server 404 may transmit the signed nonce to the device 101 whereupon device 101 may perform operation 607 and thereby verify the signed nonce. Upon verifying the validity of the digital signature, device 101 may store it and all or part of the electronic pedigree document in secure memory 206. By validating the signature, the device 101 proves that server 404 has possession of the digital signature private key that matches the digital signature public key in the electronic pedigree document, thereby proving that server 404 is the owner of the device 101.

Figure 9:
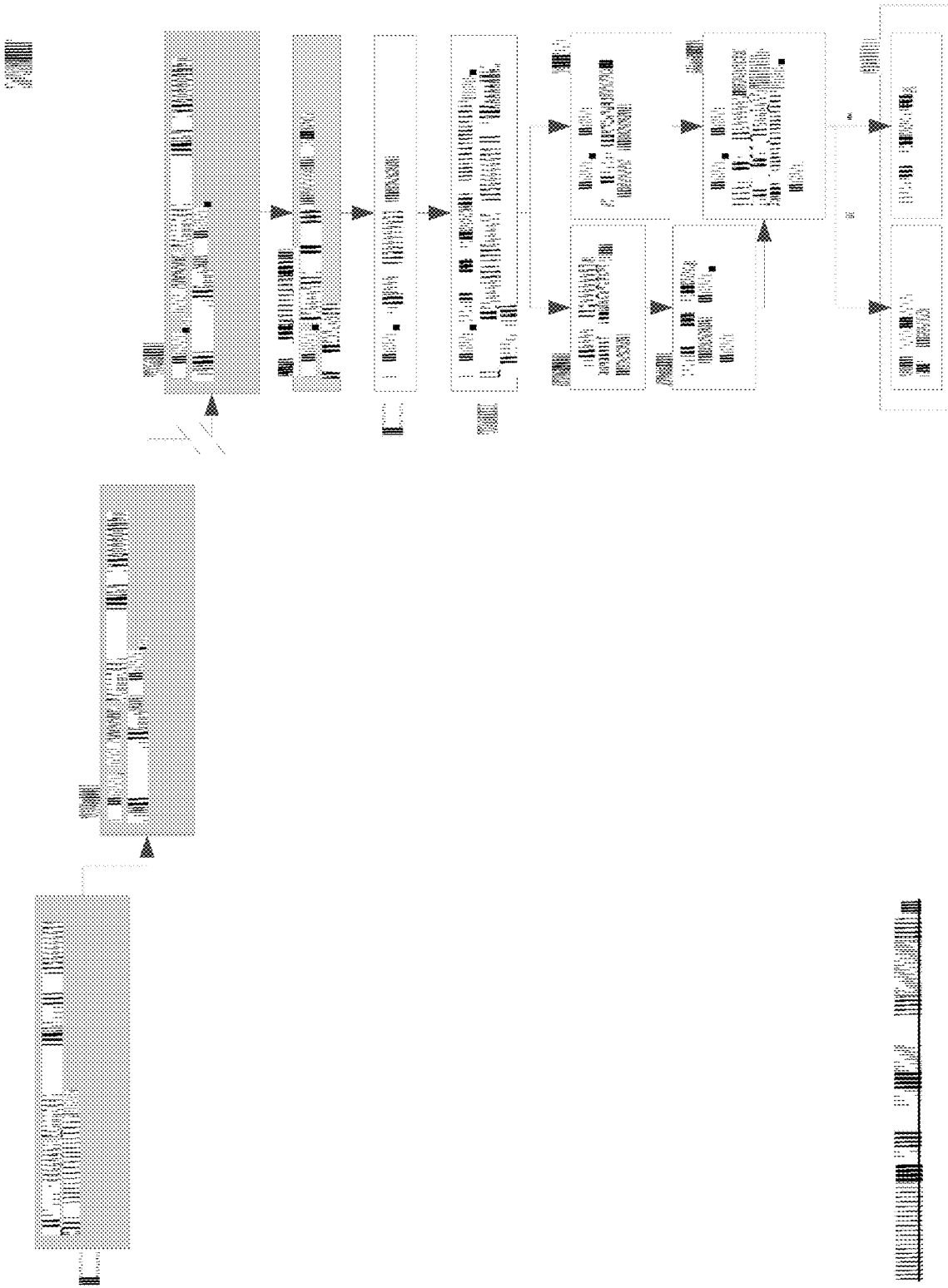
FIG. 9 illustrates a mutual authentication process that may be utilized to prove that the device is authentic in the absence of public internet connectivity.

FIG. 9 illustrates a mutual authentication process goo that may be utilized subsequent to a proof of ownership process such as process 600, process 700, and process 800 to prove that the device is authentic in the absence of public network or internet connectivity beyond the connection between the device and server of the then-current owner, which may be performed at or after the last transfer of ownership of the device or at each transfer of ownership of the device through the supply-chain. By performing operation 901, server 404 may generate a nonce, which may be generated using a TRNG or PRNG, whereupon server 404 may perform operation 902 and thereby transmit the nonce and the owner's key agreement protocol public key, which may be in the form of an Ironwood KAP, Kingwood KAP, or ECDH or some combination of key agreement protocols public key, to the device 101. By performing operation 903, the device 101 may compute a secret using such owner's key agreement protocol public key and the device's key agreement protocol private key, and then device 101 may compute a Message Authentication Code (MAC), which may consist of an AES-CMAC, on the nonce using the aforementioned computed secret, and server 404 may perform operation 904 and thereby compute a secret using the device's key agreement protocol public key and the owner's key agreement protocol private key, and then server 404 may compute a MAC, which may consist of an AES-CMAC, on the nonce using the aforementioned computed secret. Device 101, by operation 905, may transmit the generated MAC result to server 404, and server 404, by operation 906, may compare said server's MAC result with the MAC result of device 101. By operation 907, server 404 may deem device 101 authentic: the verification that device and server have produced an identical secret via producing an identical MAC may be sufficient data for the server to derive this conclusion.

Some embodiments may be used in tandem with digital signature algorithms and key agreement protocols such as those described in U.S. patent application Ser. No. 15/270,930, Signature Generation and Verification System, and Ser. No. 15/585,654, Shared Secret Data Production System, respectively, which are incorporated by reference herein in its entirety, in order to avoid some types of attacks that may be implemented on public key methods. As described in detail above, some underlying mathematical structures that may be used by some embodiments may be in abstract groups, which may include the group element multiplier and the braid group.

While various embodiments have been described above, it should be understood that they have been presented by way of example and not limitation. It will be apparent to persons skilled in the relevant art(s) that various changes in form and detail may be made therein without departing from the spirit and scope. In fact, after reading the above description, it will be apparent to one skilled in the relevant art(s) how to implement alternative embodiments. For example, in each instance of digital signature algorithm, such as WalnutDSA, an alternative digital signature algorithm may be used, or a combination of digital signature algorithms may be used. Similarly, in each instance of a key agreement protocol, such as Ironwood KAP, an alternative key agreement protocol may be used, or a combination of key agreement algorithms may be used. Other steps also may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method for device ownership management comprising:
provisioning, a server associated with an owner, a pedigree document associated with a device configured to record a chain of ownership for the device,
transferring the device from a current owner to a new owner,
provisioning at least one of device hardware, software, and firmware with an algorithmic engine including at least one of:
a digital signature algorithm and an authentication key algorithm,
at least one of server-provisioned private keys, public keys, and certificates, or
a combination thereof;
storing, by a processor of the device, one or more private keys and public keys in a secure memory of the device;
appending, by the server associated with the owner, a change in ownership, from the current owner to the new owner, to the pedigree document associated with the device that is signed with a private key of a current owner in an immutable fashion in response to the transferring of the device to the new owner;
receiving, at the device, the pedigree document that has been appended;
verifying, by the processor of the device, the pedigree document;
generating, by the processor of the device, a nonce;
transmitting, by the processor of the device, the nonce to the server associated with the owner;
signing, by the server associated with the owner, the nonce; and
verifying, by the processor of the device, the signed nonce received from the server associated with the owner, wherein verification of the signed nonce and the pedigree document enables the device to authenticate the new owner.

2. The method of claim 1, further comprising generating, by the processor of the device, the one or more private keys and public keys.

3. The method of claim 2, further comprising:
transmitting, by the processor of the device, the generated public keys to an owner server;
receiving, at the processor of the device from the server associated with the owner, the pedigree document in response to the transmitting; and
signing, by the processor of the device, the pedigree document with a private key of the device.

4. The method of claim 1, further comprising:
generating, by the server associated with the owner, the pedigree document; and
signing, by the server associated with the owner, the pedigree document with a private key of the device.

5. The method of claim 1, wherein the digital signature algorithm comprises at least one of:
a component of WalnutDSA; and
ECDSA.

6. The method of claim 1, wherein the authentication key algorithm comprises at least one of:
a component of Ironwood KAP;
a component of Kingwood KAP; and
ECDH.

7. The method of claim 1, further comprising:
transmitting, by the processor of the device, the pedigree document after signing to the server associated with the owner;
transmitting, by the server associated with the owner, the updated pedigree document after signing to a new server associated with a new owner; or
a combination thereof.

8. The method of claim 1, wherein the server associated with the owner receives at least one of public keys and identifying information from a new owner in response to an ownership change prior to appending the pedigree document to reflect the change in ownership.

9. The method of claim 1, wherein:
verifying the pedigree document comprises:
verifying the signatures in the pedigree document using the public keys in the pedigree document, paired with the keys used to sign the received appended pedigree document, and
verifying using the processor's public key; and
signing, by the server associated with the owner, the nonce comprises generating a signature on the nonce using the server associated with the owner's private key which is paired to the public key in the updated pedigree document.

10. The method of claim 1, further comprising:
generating, by the server associated with the owner, a nonce;
receiving, by the processor of the device, the nonce and the owner server's public authentication key;
generating, by the processor of the device, a secret using the received public key and the processor's private authentication key;
generating, by the processor of the device, a MAC on the nonce using said generated secret;
transmitting, by the processor of the device, the MAC to the server associated with the owner;
generating, by the server associated with the owner, a secret using the processor's public key and the server associated with the owner's private key; and at least one of:
generating, by the server associated with the owner, a MAC on the nonce using said generated secret; and
generating, by the server associated with the owner, an authentication result by comparing said generated MAC with the MAC received by the processor of the device.

11. The method of claim 10, wherein the nonce is verified at least in part by computing a MAC on the nonce using a secret.

12. The method of claim 1, wherein the pedigree document comprises a chain of blocks, where each update is a block of a blockchain generated, transmitted, signed, or verified, or a combination thereof, according to a blockchain protocol.

13. A device configured to perform ownership management comprising:
a secure memory; and
a processor in communication with the secure memory and configured to perform processing comprising:
performing processing associated with provisioning at least one of device hardware, software, and firmware with an algorithmic engine including at least one of:
a digital signature algorithm and an authentication key algorithm,
at least one of server-provisioned private and public keys, or
a combination thereof;
storing one or more private keys and the public keys in the secure memory;
upon transferring of the device from a current owner to a new owner, wherein a server associated with an owner is provisioned with a pedigree document associated with the device and configured to record a chain of ownership for the device:
receiving an appended version of the pedigree document that has been appended by the server associated with the owner with a change in ownership from the current owner to the new owner and that is signed with a private key of a current owner in an immutable fashion in response to the transferring of the device to the new owner,
verifying the pedigree document,
generating a nonce,
transmitting the nonce to the server associated with the owner, wherein the server associated with the owner signs the nonce, and
storing the appended version of the pedigree document in the secure memory; and
verifying the signed nonce received from the server associated with the owner, wherein verification of the signed nonce and the pedigree document enables the device to authenticate the new owner.

14. The device of claim 13, wherein the processor is further configured to perform processing comprising generating the one or more private keys and public keys.

15. The device of claim 14, wherein the processor is further configured to perform processing comprising:
transmitting the generated public keys to the server associated with the owner;
receiving, from the server associated with the owner, the pedigree document in response to the transmitting; and
signing the pedigree document with a private key of the device.

16. The device of claim 13, wherein the digital signature algorithm comprises at least one of:
   a component of WalnutDSA; and
   ECDSA.

17. The device of claim 13, wherein the authentication key algorithm comprises at least one of:
   a component of Ironwood KAP;
   a component of Kingwood KAP; and
   ECDH.

18. The device of claim 13, wherein the processor is further configured to perform processing comprising transmitting the pedigree document after signing to the server associated with the owner.

19. The device of claim 13, wherein the server associated with the owner receives at least one of public keys and identifying information from a new owner in response to an ownership change prior to appending the pedigree document to reflect the change in ownership.

20. The device of claim 13, wherein:
   verifying the pedigree document comprises:
      verifying the signatures in the pedigree document using the public keys in the pedigree document, paired with the keys used to sign the received appended pedigree document, and
      verifying using the processor's public key; and
   the server associated with the owner is configured to sign the nonce by generating a signature on the nonce using the server associated with the owner's private key which is paired to the public key in the updated pedigree document.

21. The device of claim 13, wherein the processor is further configured to perform processing comprising:
   receiving a nonce generated by the server associated with the owner and the server associated with the owner's public authentication key;
   generating a secret using the received public key and the processor's private authentication key;
   generating a MAC on the nonce using said generated secret; and
   transmitting the MAC to the server associated with the owner, wherein the server associated with the owner is configured to perform processing, in response, comprising:
      generating a secret using the processor's public key and the server associated with the owner's private key; and at least one of:
         generating a MAC on the nonce using said generated secret; and
         generating an authentication result by comparing said generated MAC with the MAC received by the processor.

22. The device of claim 21, wherein the nonce is verified at least in part by computing a MAC on the nonce using a secret.

23. The device of claim 13, wherein the pedigree document comprises a chain of blocks, where each update is a block of a blockchain generated, transmitted, signed, or verified, or a combination thereof, according to a blockchain protocol.

24. A server associated with an owner configured to perform ownership management comprising:
   a memory provisioned with a pedigree document associated with a device configured to record a chain of ownership for the device; and
   a processor configured to perform processing comprising:
      receiving, from the device, data indicative of a provisioning of a device processor, at least one of device hardware, software, and firmware provisioned with an algorithmic engine including at least one of:
         a digital signature algorithm and an authentication key algorithm,
         at least one of server-provisioned private keys, public keys, and certificates, or
         a combination thereof,
      wherein the device includes a secure memory and a device processor configured to operate the algorithmic engine, thereby generating a secret derived from the device processor itself, and store one or more private keys and public keys in the secure memory, and wherein the device is transferred from a current owner to a new owner;
      appending a change in ownership, from the current owner to the new owner, to the pedigree document associated with the device that is signed with a private key of a current owner in an immutable fashion in response to the transferring of the device to the new owner, wherein the device is configured to receive the pedigree document that has been appended, verify the pedigree document, generate a nonce, and transmit the nonce to the server associated with the owner; and
      sign the nonce,
   wherein the device processor is further configured to verify the signed nonce received from the server associated with the owner, wherein verification of the signed nonce and the pedigree document enables the device to authenticate the new owner.

25. The server associated with the owner of claim 24, wherein the processor is further configured to perform processing comprising:
   generating the pedigree document; and
   signing the pedigree document with a private key of the device.

26. The server associated with the owner of claim 24, wherein the digital signature algorithm comprises at least one of:
   a component of WalnutDSA; and
   ECDSA.

27. The server associated with the owner of claim 24, wherein the authentication key algorithm comprises at least one of:
   a component of Ironwood KAP;
   a component of Kingwood KAP; and
   ECDH.

28. The server associated with the owner of claim 24, wherein the processor is further configured to perform processing comprising transmitting the updated pedigree document after signing to a new owner server.

29. The server associated with the owner of claim 24, wherein the processor is further configured to perform processing comprising generating one or more private keys and public keys.

30. The server associated with the owner of claim 24, wherein the processor is further configured to perform processing comprising receiving at least one of public keys and identifying information from a new owner in response to an ownership change prior to appending the pedigree document to reflect the change in ownership.

31. The server associated with the owner of claim 24, wherein signing the nonce comprises generating a signature on the nonce using the server associated with the owner's private key which is paired to the public key in the updated pedigree document.

32. The server associated with the owner of claim 24, wherein the processor is further configured to perform processing comprising:
  generating a nonce;
  sending the nonce and the owner server's public authentication key to the device;
  receiving, from the device, a MAC generated on the nonce;
  generating a secret using the device's public key and the server associated with the owner's private key; and at least one of:
    generating a MAC on the nonce using said generated secret; and
    generating an authentication result by comparing said generated MAC with the MAC received by the processor.

33. The server associated with the owner of claim 32, wherein the nonce is verified at least in part by computing a MAC on the nonce using a secret.

34. The server associated with the owner of claim 24, wherein the pedigree document comprises a chain of blocks, where each update is a block of a blockchain generated, transmitted, signed, or verified, or a combination thereof, according to a blockchain protocol.

35. The server associated with the owner of claim 24, wherein the processor is further configured to perform processing comprising:
  receiving at least one public key from the device;
  generating the pedigree document in response to the receiving; and
  sending the pedigree document to the device.

36. The server associated with the owner of claim 35, wherein the processor is further configured to perform processing comprising receiving a signed version of the pedigree document from the device, the signed version of the pedigree document being signed with a private key of the device.

* * * * *